(12) United States Patent  (10) Patent No.: US 7,402,241 B2
Wright et al.  (45) Date of Patent: Jul. 22, 2008

(54) WATER PURIFICATION DEVICE

(75) Inventors: Jonathan P. Wright, South Ogden, UT (US); David W. Richards, Longmont, CO (US); Brent L. Cannell, Mead, CO (US)

(73) Assignee: Aquamagic, Inc., Ogden, UT (US)

( * ) Notice: Subject to any disclaimer, the term of this patent is extended or adjusted under 35 U.S.C. 154(b) by 303 days.

(21) Appl. No.: 11/323,360

(22) Filed: Dec. 29, 2005

(65) Prior Publication Data

US 2007/0151929 A1  Jul. 5, 2007

(51) Int. Cl.
*B01D 33/70* (2006.01)
*B01D 35/18* (2006.01)

(52) U.S. Cl. ..................... 210/150; 210/181
(58) Field of Classification Search .......... 210/150, 210/181, 175
See application file for complete search history.

(56) References Cited

U.S. PATENT DOCUMENTS

| 2,374,805 A | 5/1945 | Camelford ............... 422/39 |
| 3,675,442 A | 7/1972 | Swanson |
| 4,146,372 A | 3/1979 | Groth et al. |
| 4,204,956 A | 5/1980 | Flatow |
| 5,106,512 A | 4/1992 | Reidy |
| 5,149,446 A | 9/1992 | Reidy |
| 5,259,203 A | 11/1993 | Engel et al. |
| 5,301,516 A | 4/1994 | Poindexter |
| 5,517,829 A | 5/1996 | Michael |
| 5,553,459 A | 9/1996 | Harrison |
| 5,669,221 A | 9/1997 | LeBleu et al. |
| 5,845,504 A | 12/1998 | LeBleu |
| 6,056,884 A | 5/2000 | Uemura |
| 6,058,718 A | 5/2000 | Forsberg et al. ............. 62/125 |
| 6,182,453 B1 | 2/2001 | Forsberg |
| 6,588,226 B1 | 7/2003 | Semrow et al. |
| 6,684,648 B2 | 2/2004 | Faqih ......................... 62/93 |
| 6,931,860 B2 | 8/2005 | Ryan ........................ 60/783 |
| 2005/0016828 A1 | 1/2005 | Bednarek et al. ............ 203/1 |
| 2005/0029174 A1 | 2/2005 | Collins ...................... 210/143 |

*Primary Examiner*—Chester T. Barry
(74) *Attorney, Agent, or Firm*—Thorpe North & Western

(57) ABSTRACT

A water purification device including a water inlet that receives water generated by a condenser. The water purification device has a water heating apparatus that receives water from the water inlet. The water heating device has a thermal energy source that can pasteurize or flash pasteurize the water by heating the water to a predetermined temperature for a predetermined length of time. The water heating device expels the water at the end of the predetermined length of time.

7 Claims, 7 Drawing Sheets

WATER PURIFICATION DEVICE

BACKGROUND

Many municipal water systems struggle with the ever increasing demand on available potable water supplies. Additionally, natural inventories of water available for treatment are diminishing and require more treatment than ever before. Indeed, many areas of the world currently do not have adequate water treatment systems, water utility systems, or basic access to potable water.

For example, even though approximately 75% of the earth's surface is water, ninety-seven percent of this water is in saline oceans, and is therefore undrinkable and unsuitable for most uses. Of the remaining three percent that is considered fresh water, two-thirds is suspended in glaciers and the polar ice caps, and one-sixth is trapped beneath the earth's surface. Of the final one-half of one percent of the earth's water, a substantial amount has been chemically or biologically contaminated by industrialization and development. This contamination has made significant inroads into underground water sources in the latter half of the twentieth century, and has made drinking water contamination one of the highest ranking environmental risks. Clean and pure drinking water is, consequently, in great demand throughout the world, and has rapidly become one of the earth's most prized resources. Yet, billions of people lack a reliable water supply.

Nearly all fresh water on the earth is created and sustained through the hydrologic cycle. In the hydrologic cycle, heat from the sun evaporates ocean water, which falls back to earth as precipitation. Because of the hydrologic cycle, there is a continuous exchange of moisture between the oceans, the atmosphere, and the land. In the atmospheric stage of the cycle there are continually many billions of gallons of water in the air available for harvesting.

SUMMARY

The present invention provides a water purification device including a water inlet that receives water generated by a condenser. The water purification device also has a water heating apparatus that receives water from the water inlet. The water heating device has a thermal energy source that can flash pasteurize the water by heating the water to a predetermined temperature for a predetermined length of time. The water heating device expels the water at the end of the predetermined length of time. A water outlet releases water from the water heating apparatus after the water has been elevated to the predetermined temperature for the predetermined time.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
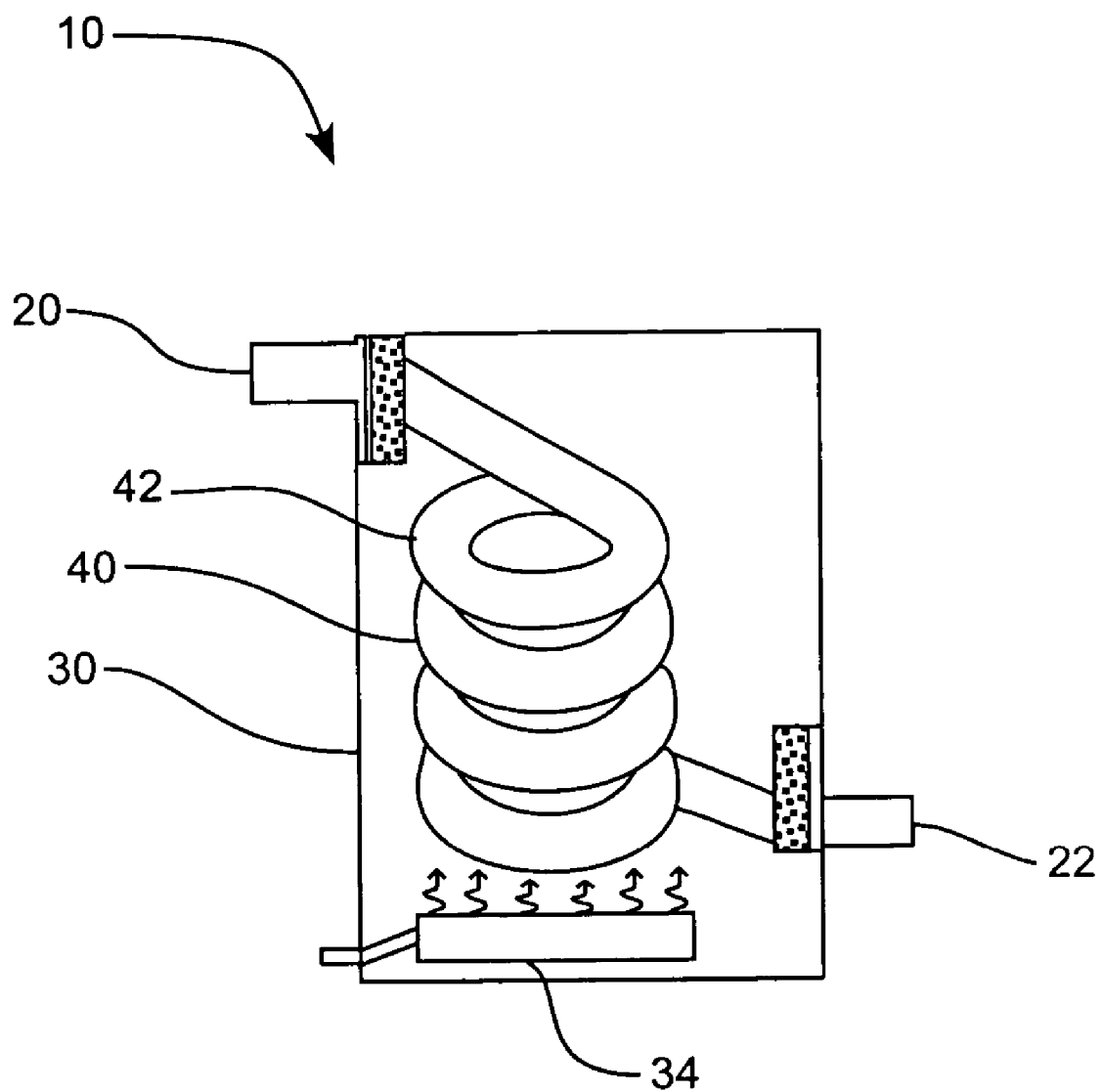
FIG. 1 is a side view of a water purification device in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXEMPLARY EMBODIMENT(S)

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention. The following detailed description and exemplary embodiments of the invention will be best understood by reference to the accompanying drawings, wherein the elements and features of the invention are designated by numerals throughout.

The present invention is generally directed to a water purification system that purifies water generated by equipment that uses a condenser such as dehumidifiers, air conditioners, freezers, refrigerators, and the like. The water purification device receives water that is generated and discharged by the condenser containing equipment and may filter the water with a pre-filter to remove large contamination, such as dust, pollen, mold, spores, bacteria and the like, from the water. The water purification device can heat, or pasteurize the water in a flash pasteurization process to destroy living contaminants not extracted by the sediment filter. The flash pasteurization process may elevate the temperature of the water to a predetermined temperature for a predetermined time in order to kill, or render inactive, living contaminants. The predetermined time of the flash pasteurization process may be a relatively short time and varies depending on the predetermined temperature. An ozonator may be used to generate ozone that may be injected or vacuumed into the pasteurized water to further purify the water. An activated carbon filter may remove organic and inorganic contaminants and other chemicals from the water before sending the water to a storage tank. Ultraviolet light or ozone can then be used periodically to maintain the purity of the water in the storage tank.

As illustrated in FIG. 1, a water purification device, indicated generally at 10, in accordance with the present embodiment is shown for use in purifying water generated by a condenser. The water purification device 10 has a water inlet 20 to receive water generated by a condenser.

For purposes of the present embodiments, a condenser can be any type of equipment that generates or condenses water during its operation. It will be appreciated that a condenser can be a part of a larger piece of equipment such as an air conditioner, a dehumidifier, a refrigerator, or a freezer. For example, dehumidifiers use condensers to extract water vapor or moisture from the air, thereby reducing the humidity of the air. Moreover, air conditioners, refrigerators and freezers use condensers to control temperature in a closed environment by extracting water vapor from the air in order to lower the dew point of the closed environment. Other condenser using equipment, as known in the art, can also generate water that is receivable by the water inlet 20 of the water purification device 10. In any case, condensers typically remove water vapor from the surrounding air by condensation and discharge the water in a liquid state.

It will also be appreciated that millions of industrial sized air conditioners and dehumidifiers are in use throughout the world every day for the purpose of creating more comfortable environments in which to live, work, shop, and play. As described above, these air conditioners and dehumidifiers lower humidity levels indoors by drawing air across a condensing apparatus that extracts water vapor from the air and condenses the vapor into liquid water. Unfortunately, the liquid water generated by these air conditioners and dehumidifiers is not safe for human consumption and is referred to as gray water. Typically, this gray water is sent down drains contributing yet more water to over-burdened water treatment facilities. Advantageously, the water purification device 10 can receive and purify liquid water discharged from a condenser or condenser containing equipment, in order to make the water potable, or suitable for human consumption.

While much research has been conducted in the areas of dehumidification, gray water purification and water filtration; little, if any research has been focused on retrofitting dehumidifiers or aftermarket mechanisms designed to purify the gray water discharge from dehumidifiers. While some technologists have developed and patented equipment for capturing water vapor, like a dehumidifier, and then purifying the captured water into drinking water, these machines have been custom built for the purpose, and hence often only the financially elite who can afford the benefit of this technology.

Additionally, the purification of gray water in such systems is typically accomplished by means of a carbon filtration apparatus, a UV light source, or a combination of these processes to kill any germicidal organisms. However, both activated carbon filtration and UV light purification have limitations. For example, activated carbon filters become burdened with time and need to be replaced in order to maintain their effectiveness. UV lamps can become dull with age, as well as from particulate buildup. With time both devices may loose their effectiveness unbeknownst to their operator. Consequently, water could pass by these systems untreated. Furthermore, the effectiveness of UV light purification is subject to the wavelength and intensity of the UV light source, the clarity of the water, as well as the distance of the light source to the microorganisms being treated. Even under normal operating conditions, organisms furthest from the UV source may receive minimal or no effects from the irradiation.

Therefore, it is a particular advantage of the present invention that the water purification device 10 can be retrofitted or added after-market, to a piece of condenser containing equipment. Thus the present invention can take advantage of the millions of condensers already in the market place and can be used to purify the water generated by already existing condensers. Additionally, the water purification device 10 can be manufactured with new condenser containing equipment.

Regardless of whether the water purification device 10 is retrofit to a condenser or manufactured along with a condenser, the water can be delivered from the condenser to the water purification device by either a pump or gravity fed plumbing.

The water purification device 10 can also have a water heating apparatus 30. The water heating apparatus 30 can receive water from the water inlet 20. The water heating apparatus 30 can also have a thermal energy source 34 to pasteurize or flash pasteurize the water by heating the water to a predetermined temperature for a predetermined length of time.

The water heating apparatus 30 can flash pasteurize discharged liquid water from a condenser. Generally, pasteurization is a purification process that uses heat to kill microorganisms by destroying the cytoplasmic membranes, or inner cell structures of the microorganisms. Pasteurization also kills microorganisms by denaturing proteins essential to microorganism survival. Flash pasteurization, or high-temperature short-time pasteurization, rapidly elevates the temperature of the water and maintains the temperature for a predetermined relatively short duration in order to kill or render undesirable microorganisms inactive. Thus, by heating the condenser discharge water to a predetermined temperature for a predetermined time, the water heating apparatus can eliminate pathogens from the water.

The water heating apparatus 30 provides several advantages over other types of purification devices and processes. For example, the water heating apparatus 30 can uniformly distribute heat throughout the condenser generated water in order to destroy microorganisms regardless of where the microorganism is positioned within the water mass. Consequently, purification of water by other more traditional filtering mechanisms.

The water heating apparatus 30 of the water purification device 10 can flash pasteurize discharged liquid water from a condenser. In one example, the predetermined temperature can be at least 161 degrees F. (72 degrees C.) and the predetermined length of time can be at least 15 seconds. In another example, the predetermined temperature can be at least 212 degrees F. and the predetermined time can be 0.01 seconds. The heated water can be expelled from the water heating apparatus 30 through a water outlet 22. It will be appreciated that other time and temperature combinations can be used, but generally the higher the temperature, the less time is needed to complete the pasteurization. Additionally, it has been found that temperatures below 161 degrees F. are not effective at neutralizing undesirable microorganisms.

The water heating apparatus 30 provides several advantages over other types of purification devices and processes. For example, the water heating apparatus 30 can uniformly distribute heat throughout the condenser generated water in order to destroy microorganisms regardless of where the microorganism is positioned within the water mass. Consequently, water purification of the present invention is not dependent on penetration of light as in an ultraviolet purifier.

Additionally, the water heating apparatus 30 of the present invention uses readily available thermal energy to purify the condenser discharge water, and so the water heating apparatus 30 does not require any specialized non-renewable equipment such as an ultraviolet light source or activated carbon filters. Furthermore, the heat transfer process of the water heating apparatus is not adversely affected by particulate buildup as is ultraviolet purification and activated carbon filter processes. Consequently, cleaning and maintenance of the apparatus can be minimized.

It will be appreciated that the thermal energy source 34 can be a conductive heat source such as an electrical heating element, a hot water jacket, a steam jacket, a fire, or a combination of these various heat sources. Additionally, the thermal energy source can be an emissive thermal heat source such as an electrical heating element, a flame, a chemical reaction, or a combination of these various heat sources.

Other thermal energy sources, as known in the art, can also be used to heat the water in the water heating apparatus 30.

The water heating apparatus 30 can also include a heat exchanger 40 that can transfer thermal energy from the thermal energy source 34 to the water received from the water inlet 20. As shown in FIG. 1, the heat exchanger 40 can include a tube 42 heated by the thermal energy source 34. In use, water can pass through the tube 42 and heat can be transferred from the tube 42 to the water. In this way, the water can continue to increase in temperature as the water travels through the tube 42 until a point near the end of the tube 42 where the water temperature is at the predetermined temperature. The temperature can be maintained at the predetermined temperature for the predetermined time, at which point the water can be discharged from the tube 42 and to a water outlet 22.

Figure 2:
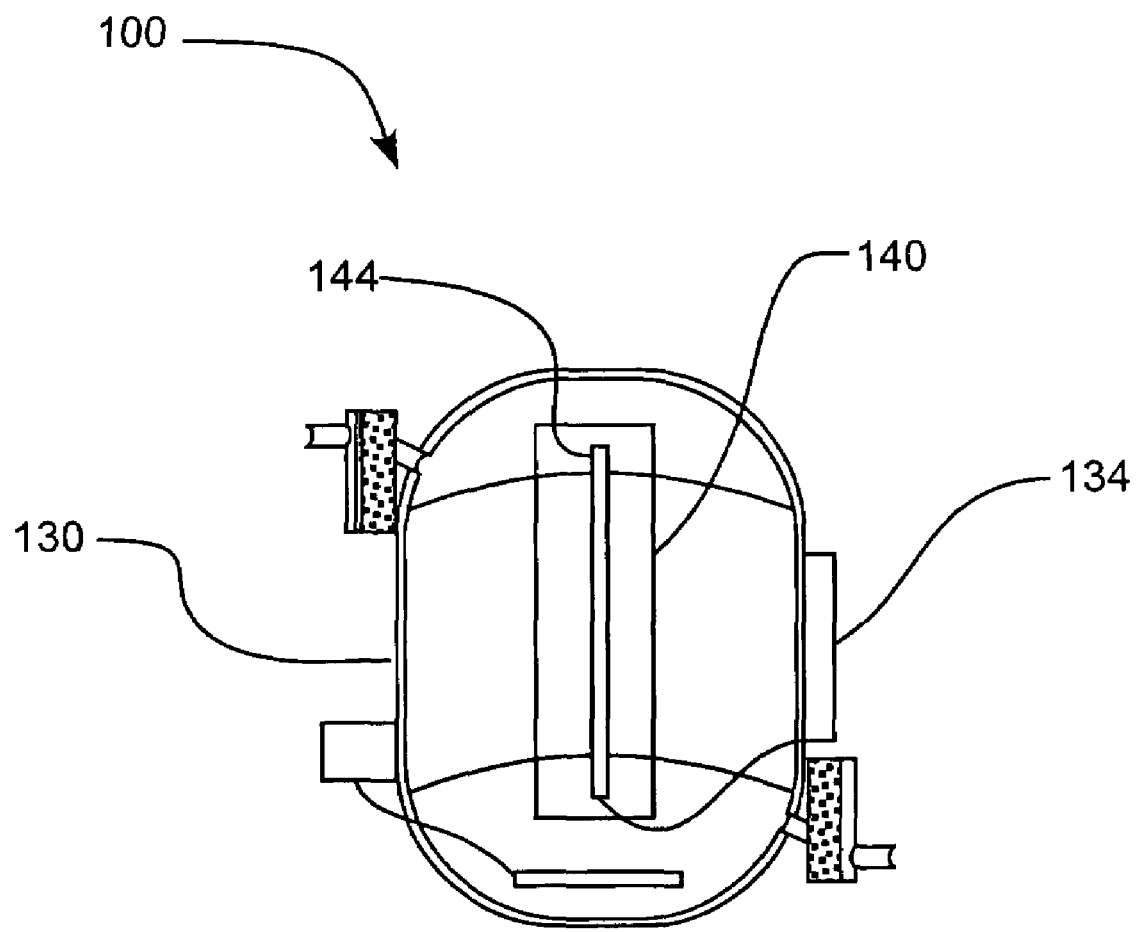
FIG. 2 is a cross section view of a water purification device in accordance with another embodiment of the present invention.

Referring to FIG. 2, a water purification device, indicated generally at 100, is shown that is similar in many respects to the device described above. The water heating apparatus 130 can have a heat exchanger 140 that can include a plate 144, or a plurality of plates (not shown) that are heated by the thermal energy source 134. In use, the water surrounds the plate 144 and the temperature of the plate 144 is raised. The plate 144 can radiate or conduct the heat to the water to elevate the temperature of the water to the predetermined temperature for the predetermined time.

Figure 3:
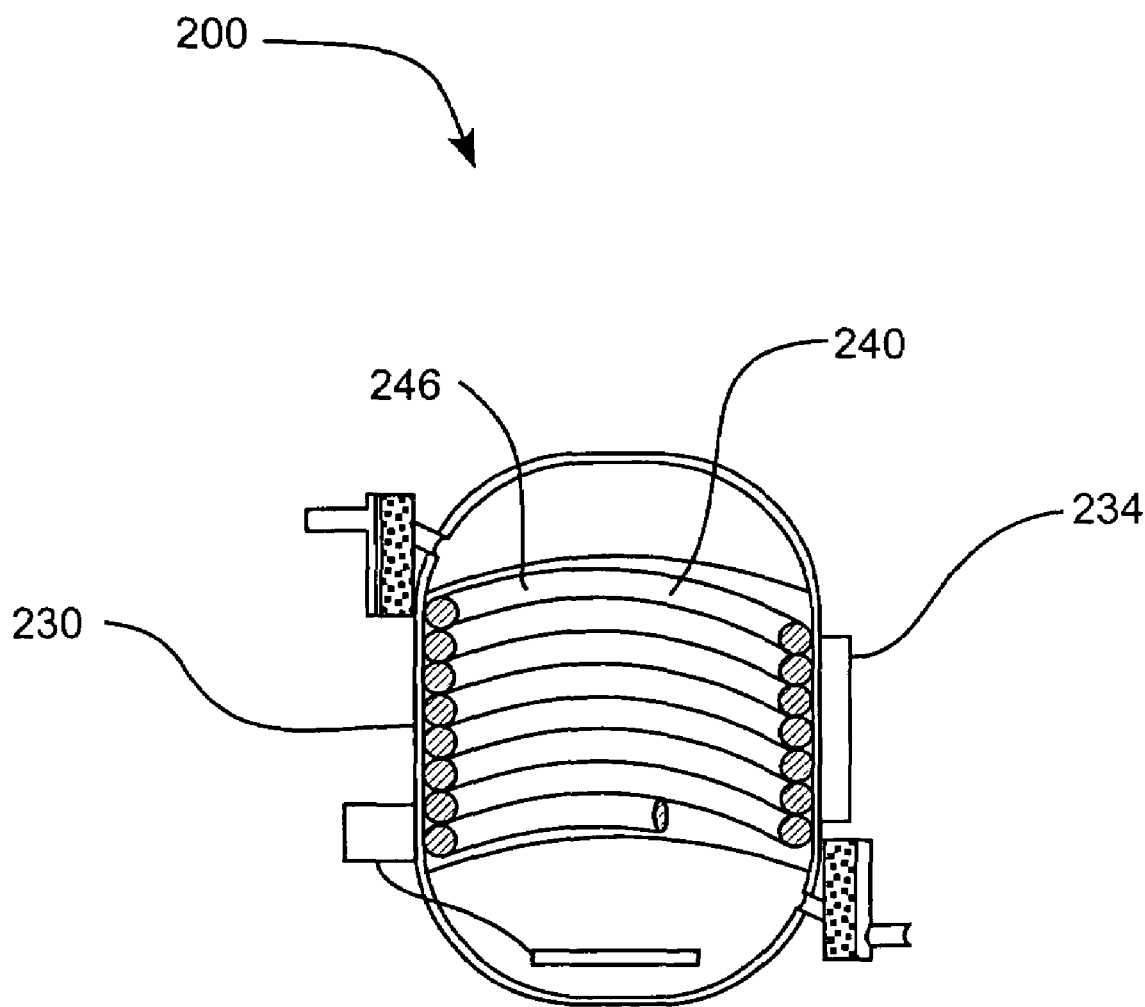
FIG. 3 is a cross section view of a water purification device in accordance with another embodiment of the present invention.

Referring to FIG. 3, a water purification device, indicated generally at 200, is shown that is similar in many respects to the devices described above. The water heating apparatus 230 can have a heat exchanger 240 with a coil 246 that is heated by the thermal energy source 234. The coil 246 can transfer heat to the water to elevate the temperature of the water to the predetermined temperature for the predetermined time. Other types of heat exchangers, as known in the art, can also be used to transfer thermal energy in the form of heat from the thermal energy source 34 to the water.

Figure 4:
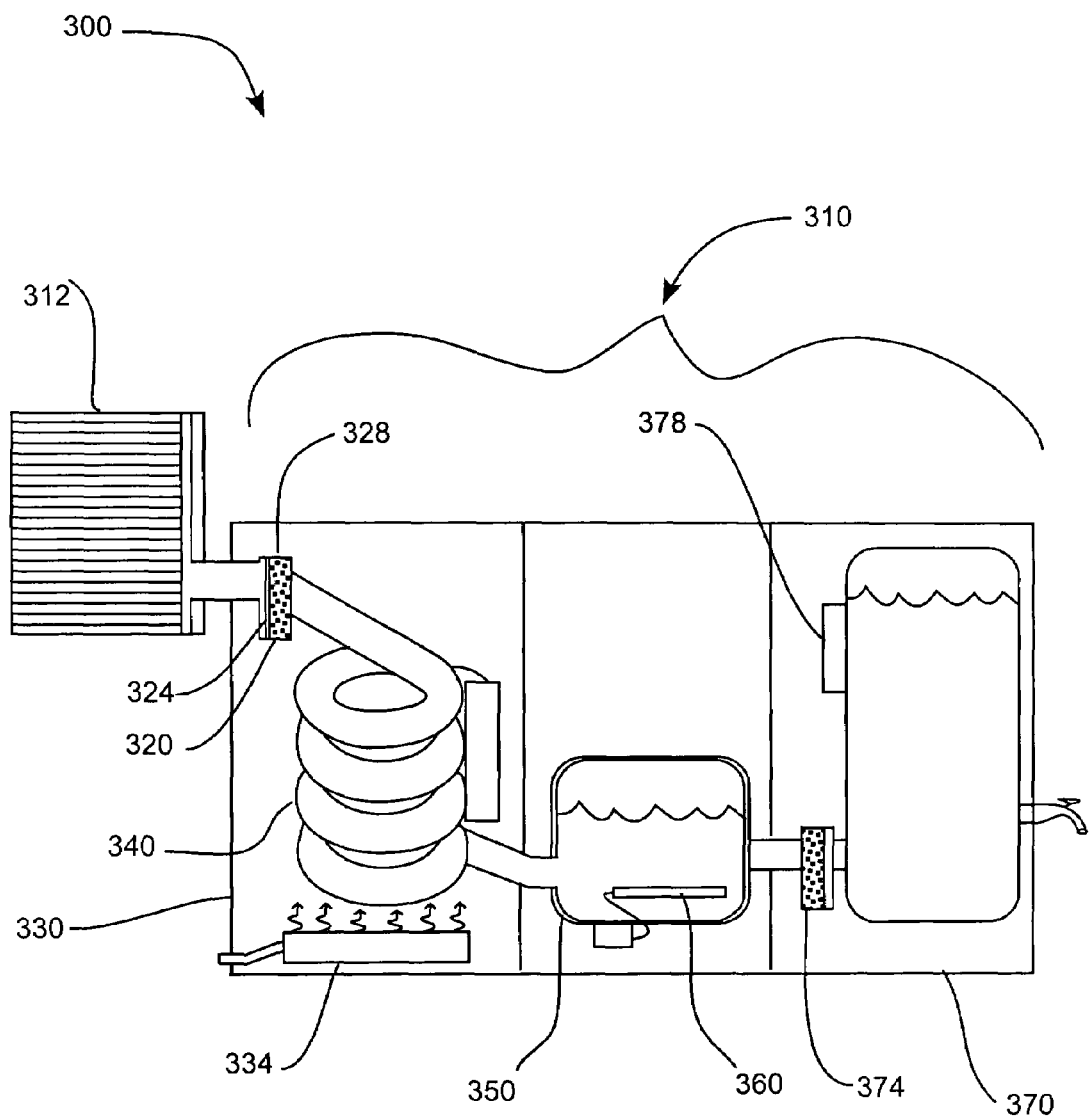
FIG. 4 is a schematic view of a water purification system in accordance with an embodiment of the present invention with the water purification device of FIG. 1 coupled to a condenser.

Illustrated in FIG. 4, a water purification system, indicated generally at 300, in accordance with the present invention is shown for use in purifying water generated by a condenser 312. The water purification system 300 includes a filtration chain, shown generally at 310. Water from a condenser 312 can be directed through the filtration chain 310 in order to make the water potable. As noted above, the condenser 312 can be a part of another piece of equipment such as an air conditioner, a dehumidifier, a refrigerator, and a freezer.

The filtration chain 310 can have a pre-filter 320 that can receive water generated by a condenser 312. The pre-filter 320 can filter relatively larger contaminants from the water. The pre-filter 320 can include a particulate screen 324 for removing particles larger than a predetermined size from water passing through the pre-filter 320. The pre-filter 320 can also include an activated carbon filter 328 for reducing environmental and biological contaminants in the condenser discharge water.

The filtration chain 310 can also have a water heating apparatus 330 that is similar in many respects to the water heating apparatus described above. The water heating apparatus 330 can have a thermal energy source 334 to pasteurize, or flash pasteurize, the water by heating the water to a predetermined temperature for a predetermined length of time. Thus, the water heating apparatus 330 can receive water from the pre-filter 320, and can flash pasteurize the water by heating the water to a predetermined temperature for a predetermined length of time. In one embodiment, the predetermined temperature can be at least 161 degrees F. (72 degrees C.) and the predetermined length of time can be at least 15 seconds. In another aspect, the predetermined temperature can be at least 212 degrees F. and the predetermined time can be 0.01 seconds. The heated water can be expelled from the water heating apparatus 30 through a water outlet 22. It will be appreciated that other time and temperature combinations can be used, but generally the higher the temperature, the less time is needed to complete the pasteurization. Additionally, it has been found that temperatures below 161 degrees F. are not effective at neutralizing undesirable microorganisms unless longer treatment times are permitted.

The water heating apparatus 330 can receive water from the pre-filter 320. The water heating apparatus 330 can include a heat exchanger 340 that can transfer thermal energy from the thermal energy source 334 to the water received from the pre-filter 320. The heat exchanger 340 can transfer heat from the heat exchanger 340 to the water. In this way, the water can continue to increase in temperature as the water travels through, or about the heat exchanger 340 until the temperature throughout the water, or throughout a cross section of the water mass, is at least at the predetermined temperature. It will be appreciated that water nearer the heat exchanger 340 can have a higher temperature than the predetermined temperature when water farther from the heat exchanger 340 is at the predetermined temperature. Thus, the temperature throughout the water mass can be maintained at least at the predetermined temperature for the predetermined time.

The water heating apparatus 330 can expel the water at the end of the predetermined length of time into a cooling unit 350. The cooling unit 350 can reduce the temperature of the water.

Biofilms (colonized layers of microorganisms) can form when bacteria, and other microorganisms adhere to each other and to the surfaces to which they come into contact with. Biofouling (acid production, equipment corrosion, toxin production, etc.) can result within the water purification system 300 if these biofilms are allowed to grow. Under normal equipment operation, it is anticipated that biofilms will develop within the water collection system, water purification train, and water storage container. Thus, from time to time, as the water purification device operates, it will need to be flushed and sanitized to eliminate these biofilms to safe levels.

Ozone (O3) is lethal to microbes, viruses, parasites, pesticides and the like. Ozone is also a very effective disinfectant. Ozone is highly reactive and once it comes into contact with organic or inorganic matter ozone reacts with the matter and reduces the unstable triatomic oxygen (O3) back to diatomic oxygen (O2). In the presence of bacteria, ozone attaches to the cell wall of the organism causing the cell to lyse (rupture). It has been shown that ozone can be more than 3000 times more effective at destroying undesirable water contamination than chlorine sanitizers. Additionally, ozone can also be produced readily in remote locations with the use of ambient air and is very cost effective.

Thus, an ozonator 360 can be used to further purify the water in the water purification system 300 by releasing ozone into the water. It will be appreciated that the ozonator 360 can be placed in the cooling unit 350 as shown in FIG. 4, as well as in a variety of other locations along the filtration chain 310. Additionally, ozone can be injected into multiple locations in the filtration chain. Ozone can also be used to periodically re-purify stored water as well as periodic sanitization of the water purification system 300.

The filtration chain 310 can also have a post cooling purifier 370 that can receive water from the cooling unit 350 and reduce remaining contamination from the water. The post cooling purifier 370 can include an activated carbon filter 374 that can further reduce environmental contaminants from the water. The post cooling purifier 370 can also include an Ultraviolet (UV) light source 378 for further purification of the water. The UV light source purifier 378 can reduce biological contaminants from water from the carbon filter.

Figure 5:
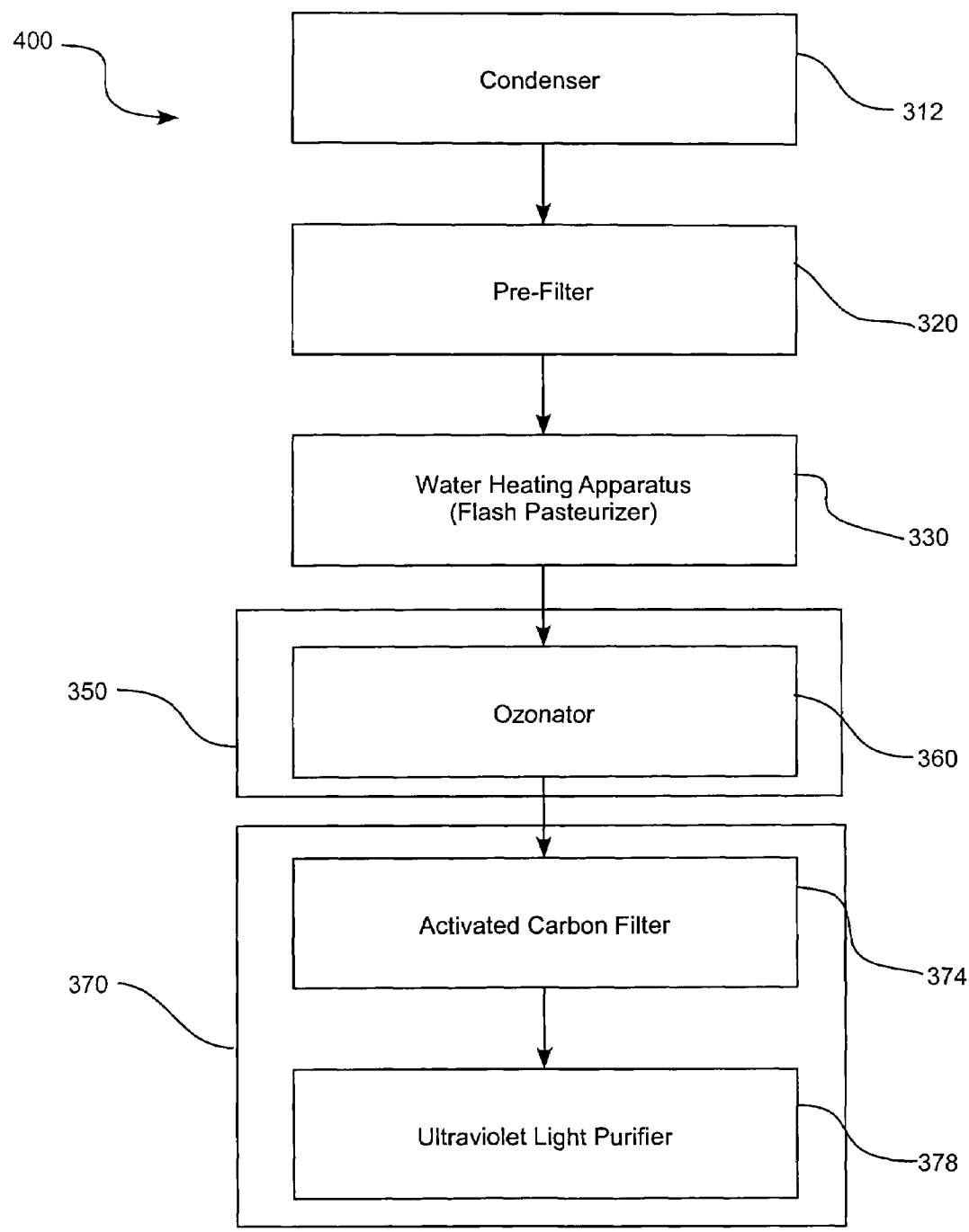
FIG. 5 is a block diagram of a water flow path in accordance with the water purification device of FIG. 1.

Referring to FIG. 5, a block diagram illustrates the flow path, indicated generally at 400, of water from a condenser through the water purification filtration chain 310 of the water purification system 300 discussed above. Water can be discharged from the condenser 312 and received by the pre-filter 320 which filters larger contaminants such as dust, pollen, spores, and the like from the water. The water then flows to the water heating apparatus 330 where the water is heated to a predetermined temperature and maintained at the predetermined temperature for a predetermined time so that the water is pasteurized or flash pasteurized. The water then flows to a cooling unit 350 or tank where an ozonator 360 can inject ozone into the water to further purify the water. The water then flows through post cooling purifier 370 that can have an activated carbon filter 374 for further filtering environmental contaminants and an ultraviolet light purifier 378 that can reduce biological contaminants. The water can then be used in potable water applications or the water can be stored for future use.

In the case where the water is stored for future use, additional purifying processes can be used periodically to maintain the purity of the stored water. For example, an Ultraviolet light source 378 can be used to periodically irradiate the stored water to reduce development of contamination in the stored water.

Figure 6:
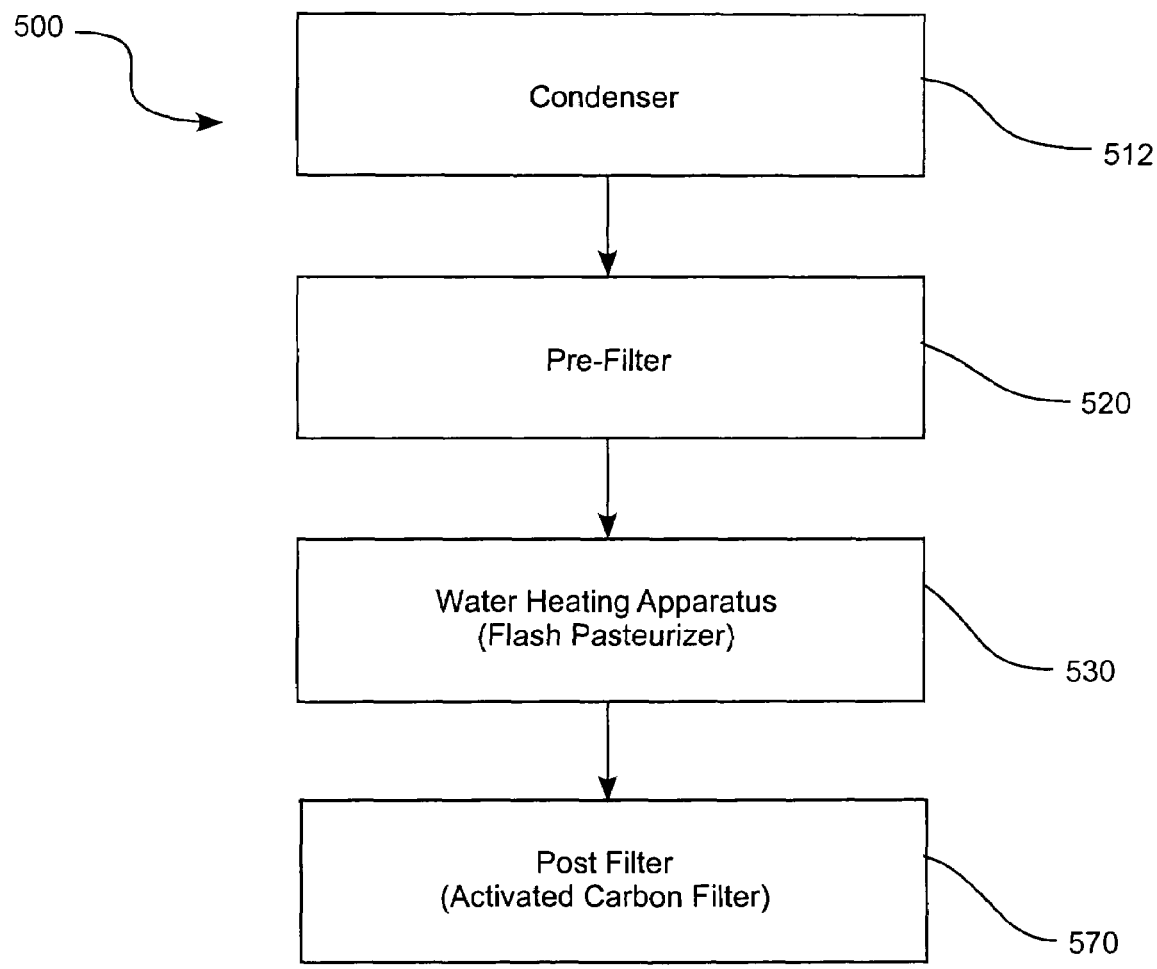
FIG. 6 is a block diagram of another water flow path in accordance with an embodiment of the present invention.
Figure 7:
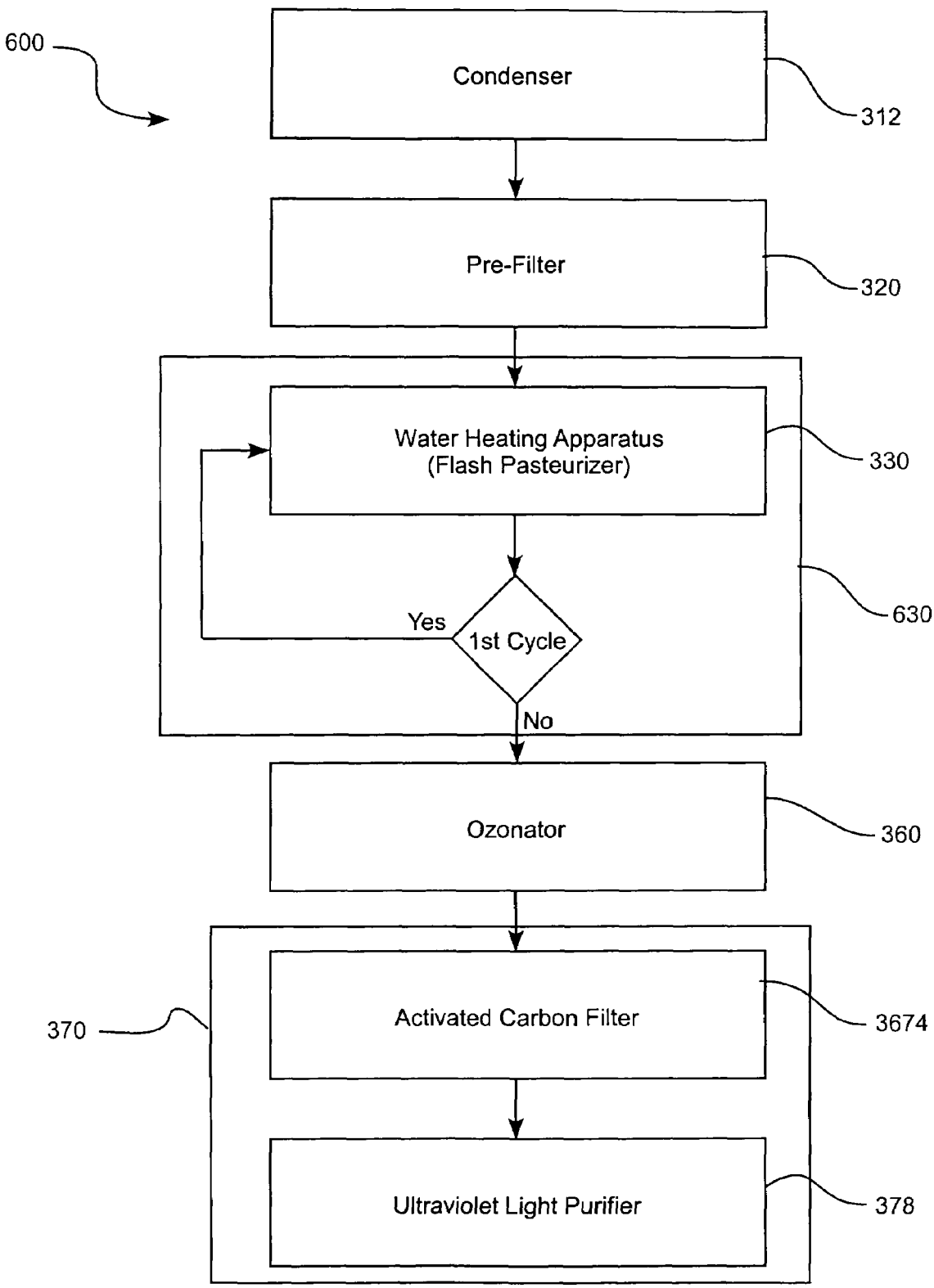
FIG. 7 is a block diagram of another water flow path in accordance with an embodiment of the present invention.

It will be appreciated that some of the elements of the flow path described above can be eliminated or duplicated as circumstances may require. Additionally, the sequence of the elements of the flow path can be rearranged in a variety of orders to accommodate particular purification needs. For example, referring to FIG. 6, a block diagram illustrating a water flow path 500 in accordance with another embodiment of a water purification system is shown that is similar in many respects to the water purification system described above. In this flow path, water flows into a prefilter 520 from the condenser 512 and from the prefilter 520 to the water heating apparatus 530. Water then flows from the water heating apparatus 530 to a post filter 570 that has only an activated carbon filter. As another example, the water could be sent through the water heating apparatus 630 twice to ensure thorough pasteurization, as shown in the water flow path 600 of FIG. 7. Thus, the filtration train can be tailored to meet the needs of a particular filtration application.

The present invention also provides for a method for purifying water, including obtaining water from a condenser and filtering the water with a pre-filter to remove larger contaminants from the water. The water can be heated with a water heating apparatus to a predetermined temperature for a predetermined length of time to reduce active biological contaminants in the water. The water heating apparatus can include a thermal energy source and a heat exchanger for transferring heat from the thermal energy source to the water. The water can be cooled in a cooling unit. The water can also be filtered with an activated carbon filter to decrease contaminants in the water.

The method of purifying water or sanitizing the unit can also include ozonating the water by injecting ozone from an ozone source into the water or unit.

The step of obtaining water from a water source can also include extracting water from surrounding air with a condenser in an air conditioner or dehumidifier. Additionally, the step of filtering the water from the cooling unit can also include passing the water through an activated carbon filter to decrease contaminants in the water. Moreover, the step of filtering the water from the cooling unit can also include exposing the water from the activated carbon filter to an ultraviolet light source to reduce active biological contaminants in the water.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A water purification system, comprising:
   a condenser, configured to extract water vapor from air and condense the water vapor into liquid water;
   a pre-filter in fluid communication with the condenser and configured to receive water generated by the condenser to filter larger contaminants from the water;
   a water heating apparatus in fluid communication with the pre-filter and configured to receive water from the pre-filter, and having a thermal energy source to flash pasteurize the water by heating the water to a predetermined temperature between 161° F. and 212° F., inclusive, for a predetermined length of time between 0.01 seconds and 15 seconds, inclusive, and to expel the water from the water heating apparatus at the end of the predetermined length of time;
   a cooling unit in fluid communication with the water heating apparatus and configured to receive water from the water heating apparatus and to reduce the temperature of the water received from the water heating apparatus; and
   a post cooling purifier in fluid communication with the cooling unit and configured to receive water from the cooling unit and to reduce the concentration of remaining contamination in the water.

2. The system of claim 1, wherein the pre-filter includes a particulate screen for removing particles larger than a predetermined size from water passing through the pre-filter, and a carbon filter for reducing environmental contaminants.

3. The device of claim 1, wherein the condenser is an operative part of an appliance selected from the group consisting of an air conditioner, a dehumidifier, a refrigerator, and a freezer.

4. The device of claim 1, wherein the water heating apparatus comprises:
   a heat exchanger for transferring thermal energy from the thermal energy source to water received from the water inlet.

5. The device of claim 4, wherein the heat exchanger includes a heat transfer element selected from the group consisting of a tube, a plate, and a coil.

6. The device of claim 4, wherein the thermal energy source is selected from the group consisting of an electrical current, a hot water jacket, a steam jacket, a flame, a chemical reaction, and combinations thereof.

7. The device of claim 1, wherein the post cooling purifier comprises:
   an activated carbon filter, configured to reduce environmental contaminants from water from the cooling unit;
   an ultraviolet light treatment filter source, operable to reduce biological contaminants from water from the carbon filter; and
   an ozonator, configured to purify water by releasing ozone into the water.

* * * * *